United States Patent
Courcot Mendez et al.

(10) Patent No.: US 9,340,460 B2
(45) Date of Patent: May 17, 2016

(54) ULTRA-REFRACTORY MATERIAL THAT IS STABLE IN A WET ENVIRONMENT, AND PROCESS FOR MANUFACTURING SAME

(75) Inventors: Emilie Courcot Mendez, Le Taillan (FR); Jacques Thebault, Bordeaux (FR); Anne Sauveroche, Le Pian Medoc (FR)

(73) Assignee: HERAKLES, Le Haillan (FR)

( * ) Notice: Subject to any disclaimer, the term of this patent is extended or adjusted under 35 U.S.C. 154(b) by 80 days.

(21) Appl. No.: 14/241,948

(22) PCT Filed: Aug. 6, 2012

(86) PCT No.: PCT/FR2012/051851
§ 371 (c)(1),
(2), (4) Date: Sep. 18, 2014

(87) PCT Pub. No.: WO2013/030484
PCT Pub. Date: Mar. 7, 2013

(65) Prior Publication Data
US 2015/0175487 A1    Jun. 25, 2015

(30) Foreign Application Priority Data

Aug. 31, 2011   (FR) ..................... 11 57670

(51) Int. Cl.
| | |
|---|---|
| *C04B 35/58* | (2006.01) |
| *C04B 35/64* | (2006.01) |
| *C04B 41/87* | (2006.01) |
| *C04B 41/89* | (2006.01) |
| *C04B 41/00* | (2006.01) |
| *C04B 41/50* | (2006.01) |

(Continued)

(52) U.S. Cl.
CPC ........... *C04B 35/58078* (2013.01); *C04B 35/64* (2013.01); *C04B 35/645* (2013.01); *C04B 41/009* (2013.01); *C04B 41/507* (2013.01); *C04B 41/52* (2013.01); *C04B 41/87* (2013.01); *C04B 41/89* (2013.01); *C04B 2235/3225* (2013.01); *C04B 2235/3813* (2013.01); *C04B 2235/3826* (2013.01); *C04B 2235/3839* (2013.01); *C04B 2235/6562* (2013.01); *C04B 2235/6565* (2013.01); *C04B 2235/6567* (2013.01); *C04B 2235/666* (2013.01); *C04B 2235/9684* (2013.01); *Y10T 428/30* (2015.01)

(58) Field of Classification Search
None
See application file for complete search history.

(56) References Cited

U.S. PATENT DOCUMENTS 4,379,852 A * 4/1983 Watanabe ............... C04B 35/58
                                                            501/87
5,036,028 A * 7/1991 Watanabe ........... C04B 35/5805
                                                            501/87

(Continued)

FOREIGN PATENT DOCUMENTS

| DE | 3815648 A1 | 12/1988 |
|---|---|---|
| DE | 102006035792 A1 | 1/2008 |

(Continued)

OTHER PUBLICATIONS

Andreani et al., "Oxidation of Refractory Metallic Coatings on Carbon Fibers Heated Up to 1850° C.," Surface & Coatings Technology, 2010, pp. 1262-1267, vol. 205, Elsevier B.V.

(Continued)

*Primary Examiner* — David Sample
(74) *Attorney, Agent, or Firm* — Workman Nydegger

(57) ABSTRACT

A refractory material withstanding high temperatures in an oxidizing medium contains at least hafnium boride and tantalum boride, hafnium and tantalum being present in the refractory material exclusively in compound form.

11 Claims, 1 Drawing Sheet

(51) Int. Cl.
*C04B 41/52* (2006.01)
*C04B 35/645* (2006.01)

(56) References Cited

U.S. PATENT DOCUMENTS

| | | | |
|---|---|---|---|
| 8,357,423 B2 | 1/2013 | Thebault et al. | |
| 8,673,794 B1 * | 3/2014 | Ramachandran | C04B 35/563 501/87 |
| 2007/0228985 A1 * | 10/2007 | Sommerer | G02B 5/206 313/635 |
| 2008/0024061 A1 | 1/2008 | Bunk et al. | |
| 2011/0017353 A1 | 1/2011 | Thebault et al. | |
| 2013/0196133 A1 * | 8/2013 | Keller | C04B 35/522 428/220 |

FOREIGN PATENT DOCUMENTS

| | | |
|---|---|---|
| GB | 1384883 A | 2/1975 |
| JP | 08148294 A | 6/1996 |
| WO | 2009081006 A2 | 7/2009 |

OTHER PUBLICATIONS

Courtright et al., "Oxidation of Hafnium Carbide and Hafnium Carbide with Additions of Tantalum and Praseodymium," Oxidation of Metals, Dec. 1, 1991, pp. 423-437, vol. 36, No. 5/6, Kluwer Academic Publishers-Plenum Publishers, NE.

International Search Report for corresponding International PCT Application No. PCT/FR2012/051851, mailed Oct. 31, 2012.

Marnoch, "High-Temperature Oxidation-Resistant Hafnium—Tantalum Alloys," Journal of Metals, Nov. 1965, pp. 1225-1231.

Sciti et al., "Oxidation Behavior of HfB2-15 vol.% TaSi2 at Low, Intermediate and High Temperatures," Scripta Materialia, Sep. 1, 2010, pp. 601-604, vol. 63, No. 6, Elsevier, NL.

Sciti et al., "Spark Plasma Sintering of hfB2 with Low Additions of Silicides of Molybdenum and Tantalum," Journal of the European Ceramic Society, Nov. 1, 2010, pp. 3253-3258, vol. 30, No. 5, Elsevier Science Publisher, GB.

Silvestroni et al., Densification of ZrB2—TaSi2 and HfB2—TaSi2 Ultra-High-Temperature Ceramic Composites, J. Am. Ceram. Society, Jun. 1, 2011, pp. 1920-1930, vol. 94, No. 6.

* cited by examiner

ULTRA-REFRACTORY MATERIAL THAT IS STABLE IN A WET ENVIRONMENT, AND PROCESS FOR MANUFACTURING SAME

BACKGROUND OF THE INVENTION

The invention relates to making an ultra-refractory material that withstands high temperatures in an oxidizing medium, in particular in the presence of air, of water vapor, and more generally in the presence of any gaseous or liquid phase containing oxygen or an oxygen compound.

The invention relates in particular to making refractory material parts that are suitable for constituting protection that withstands an oxidizing medium at high temperature.

The invention also relates to protecting thermostructural composite materials made up of fiber reinforcement densified by a matrix against high temperatures in an oxidizing medium. More particularly, but not exclusively, the invention relates to thermostructural composite materials containing carbon and/or silicon carbide (SiC), such as carbon/carbon (C/C) composite materials that are constituted by carbon fiber reinforcement densified by a carbon matrix, and to ceramic matrix composite materials in which the fibers and/or the matrix contain SiC.

The invention also relates to protecting monolithic materials based on carbon (e.g. graphite) or on SiC-based ceramic against high temperatures.

Thermostructural composite materials are characterized by their mechanical properties that make them suitable for constituting structural parts, and by their ability to conserve those mechanical properties at high temperatures. Nevertheless, when they contain carbon, composite materials present the major drawback of oxidizing as from 400° C. in air or in an oxidizing medium and of losing their thermostructural properties in part.

Furthermore, with monolithic ceramic materials or composite materials comprising SiC, the SiC oxidizes in two modes. The first mode corresponds to so-called "passive" oxidation, which occurs under a high partial pressure of oxygen and at a temperature that is relatively low, the SiC then becoming covered in a layer of silica. The second mode, known as "active oxidation", occurs when the SiC is raised to very high temperature under a low partial pressure of oxygen, the SiC then being consumed rapidly since all of the oxides that are formed are in the gaseous state.

With C/C composite materials, it is known to use protective layers made up of ultra-refractory single-layer deposits based on hafnium diboride ($HfB_2$) or of zirconium diboride ($ZrB_2$). Among the various systems fabricated by mixing $(Zr/Hf)B_2$ and SiC, one of the most widely-used is that comprising 20% by volume SiC (giving an atomic ratio (Zr or Hf)/Si=2.7), possibly with additives ($RE_2O_3$ preferably up to 3% by volume (where RE designates a rare earth comprising yttrium (Y) and the lanthanides), or $REB_6$, $MoSi_2$, or AN preferably at 10% by volume), or a mixture of those compositions.

Nevertheless, that type of protection material presents two drawbacks, namely:

a coefficient of thermal expansion that is too great relative to that to the C/C material, thereby leading to cracks appearing in the ultra-refractory layer and to loss of cohesion along the interface between the C/C material and the layer. The cracks created in this way then become paths for diffusing oxygen and water (if any is present in the environment in use), thereby leading to the C/C substrate being oxidized and having its mechanical properties weakened or even lost; and poor resistance to oxidation at temperatures higher than 2300° C.

In order to mitigate the first above-mentioned drawback, an underlayer based on SiC alone has been introduced between the C/C substrate and the ultra-refractory layer so as to provide a layer for matching coefficients of thermal expansion. Nevertheless, that solution is not considered as being sufficiently satisfactory since, depending on utilization conditions, SiC oxidizes either passively by becoming covered in a layer of silica which interacts with the ultra-refractory layer, or else actively, which leads to pores being formed in the SiC layer, or even to loss of cohesion.

The documents "High temperature oxidation-resistant hafnium-tantalum alloys" by K. Marnoch, J. Metais 1225 (1965) and "Oxidation of refractory metallic coatings on carbon fibers heated up to 1850° C." by A.-S. Andréani et al., ICMCTF No. 37, San Diego, 2010, Vol. 205, No. 5 (482 p.) pp. 1262-1267, propose using alloys of hafnium (Hf) and of tantalum (Ta) or HfC—Ta, Hf—$TaB_2$, or Hf—TaC mixed compositions in order to improve the oxidation resistance of ultra-refractory systems. Although those systems give results that are satisfactory in air, they cannot be used in the presence of water or water vapor because of the great instability of the metals Hf and Ta, since these metals generate explosive vapors in the presence of water.

Although such compositions do indeed resist oxidation in air at temperatures higher than 2000° C., they cannot be used in the presence of water because the metallic materials Hf and Ta are unstable in the presence of water. That drawback limits the field of utilization of such compositions by excluding applications that involve atmospheres containing water. Furthermore, certain techniques for preparing materials, such as for example a liquid technique in which an aqueous solvent might be used, likewise cannot be used. Finally, they give rise to a problem of storing them in powder form since it is necessary to guarantee that they are stored with no moisture.

There thus exists a need for a protection material that resists oxidation at temperatures higher than 2000° C., and in particular in the presence of a wet environment (water present).

This applies in particular to components for rocket engines or for aeroengines of the turbojet type in which the water vapor and the carbon dioxide that are produced and ejected through the nozzle create an environment that is wet and oxidizing. This protection problem also occurs for vehicle heat shields for re-entry into the atmosphere.

OBJECT AND SUMMARY OF THE INVENTION

An object of the invention is to provide a refractory material that withstands high temperatures, and in particular that withstands oxidation at temperatures higher than or equal to 2000° C., under pressure conditions going from very low pressure (≥1 pascal (Pa)) up to higher values (>30 megapascals (MPa)) and in environments that in particular involve the presence of water.

This object is achieved by a refractory material that withstands high temperatures in an oxidizing medium, the material being characterized in that it contains at least a hafnium boride and a tantalum boride, hafnium and tantalum being present in said material exclusively in compound form.

Such a material constitutes a protection system that is suitable for conserving its ultra-refractory nature and its chemical stability regardless of the intended conditions of utilization and in particular in the presence of water. By using hafnium and tantalum in the form of compounds or derivatives rather than in metallic form, any risk of violent reactions that might occur in the presence of water when those elements are present in metallic form are avoided.

In addition, by using hafnium and tantalum borides, the composition contains boron, which serves to increase the utlrarefractory nature of the material while providing a first healing phase at about 1700° C.

In a first aspect of the material, it also contains at least one of the elements selected from: carbon and nitrogen. Introducing carbon or nitrogen makes it possible to increase the ultra-refractory nature of the material, thus making it possible to use it at temperatures that are even higher.

Under oxidation conditions at ultra high temperature, the presence of boron, of carbon, or of nitrogen gives rise to the production of gaseous compounds only such as CO, $CO_2$, $B_2O_3$, or NOx, and they are not harmful to the stability of the solid or liquid phases formed during utilization.

In a second aspect of the material of the invention, the atomic ratio of hafnium to tantalum is strictly greater than 1 and less than 10 ($1<n_{Hf}/n_{Ta}<10$), preferably with a ratio $n_{Hf}/n_{Ta}=2.7$, while the atomic ratio of boron to tantalum is greater than or equal to 5.4 ($n_B/n_{Ta} \leq 5.4$).

In a third aspect of the material of the invention, it preferably contains:

50% by volume $HfB_2$;
75% by volume HfC; and
25% by volume $TaB_2$.

The invention also provides a refractory part that withstands high temperatures in an oxidizing medium, the part being characterized in that it is constituted by a refractory material of the invention.

The invention also provides a part comprising a substrate made of a determined material suitable for being used at temperatures higher than 2000° C., said part being provided with a protective coating that provides protection at high temperatures in an oxidizing medium, the part being characterized in that said protective coating is constituted by a refractory material of the invention. The part may in particular be intended for applications in valves, propulsion, and atmosphere re-entry, or indeed in solar applications.

The substrate of the part may be made in particular out of:
a monolithic ceramic material based on silicon carbide;
a monolithic material based on carbon (e.g. graphite);
a ceramic matrix composite material comprising silicon carbide; or
an optionally pretreated C/C composite material.

For a substrate made of C/C composite material, the part may further include a layer of silicon carbide close to the C/C material of the substrate and a layer of zirconium carbide or of hafnium carbide interposed between the layer of silicon carbide and the protective coating. A double bonding layer is thus formed that serves to accommodate thermomechanical stresses between the material of the substrate and the protective coating depending on the thicknesses of the layers used.

The presence of SiC in the substrate of the part or in the layers underlying the protective coating does not give rise to problems since the protective coating of the invention forms an effective barrier that prevents oxygen from reaching the SiC present in the part.

The invention also provides a method of making a part out of refractory material that withstands high temperatures in an oxidizing medium, the method being characterized in that it comprises:

making a composition containing at least a hafnium boride and a tantalum boride, hafnium and tantalum being present in said composition exclusively in compound form; and shaping the composition and densifying said composition.

The invention also provides a method of making of making a protective layer that withstands high temperatures in an oxidizing medium on a part comprising a substrate made of a determined material, said method comprising:

applying on the part a composition containing at least a hafnium boride and a tantalum boride, hafnium and tantalum being present in said composition exclusively in compound form; and densifying said composition.

In a first aspect of the method of the invention, the composition also contains at least one of the elements selected from: carbon and nitrogen.

In a second aspect of the method of the invention, the substrate of the part may in particular be made:

a monolithic ceramic material based on silicon carbide;
a monolithic material based on carbon (e.g. graphite);
a ceramic matrix composite material comprising silicon carbide; or
an optionally pretreated C/C composite material.

For a substrate made of C/C composite material, the part may further include a layer of silicon carbide close to the C/C material of the substrate and a layer of zirconium carbide or of hafnium carbide interposed between the layer of silicon carbide and the protective coating. A double bonding layer is thus formed that serves to accommodate thermomechanical stresses between the material of the substrate and the protective coating depending on the thicknesses of the layers used.

BRIEF DESCRIPTION OF THE DRAWING

Other characteristics and advantages of the invention appear from the following description of particular embodiments of the invention given as non-limiting embodiments and with reference to the accompanying drawing, in which.

DETAILED DESCRIPTION OF EMBODIMENTS

Figure 1:
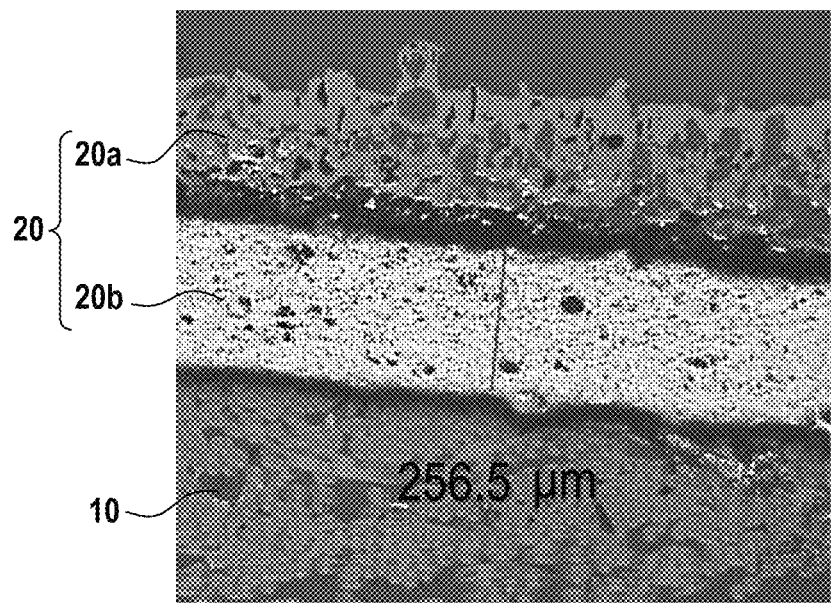
FIG. 1 is a photograph showing a fragmentary section view of a C/C composite testpiece covered in a protection material of the invention after the testpiece was exposed to a high temperature thermal flux in a corrosive medium.

The invention proposes a novel ultra-refractory material suitable for withstanding temperatures higher than 2000° C., and more particularly higher than 2300° C., in an oxidizing medium, and in particular a wet environment involving the presence of oxygen and of water vapor.

The material of the invention may be used to form refractory parts for use under such conditions, such as for example heat shields for enabling vehicles to re-enter the atmosphere. The material of the invention may also be used as a protective coating for substrates of parts that are to be exposed to high temperatures (greater than 2300° C.) in an oxidizing medium, in particular the throats of rocket engine nozzles or portions of aeroengines, in particular of the turbojet type.

The substrate of the part may be made of a thermostructural composite material containing at least some carbon, such as for example C/C composites, which in known manner comprise a material made up of carbon fiber reinforcement densified by a carbon matrix. The substrate may also be made using a ceramic matrix composite (CMC) thermostructural material which, in this example, corresponds to a material made of carbon or SiC fiber reinforcement densified by a matrix comprising SiC at least in part, such as for example the following composite materials:

C—C/SiC corresponding to a material made up of carbon fiber reinforcement and densified by a matrix having a carbon phase and a silicon carbide phase;

C—SiC corresponding to a material made up of carbon fiber reinforcement densified by a matrix of silica carbide; and SiC/SiC corresponding to a material made up of silicon carbide fiber reinforcement densified by a matrix of silicon carbide.

With a CMC substrate, the substrate is preferably machined and does not include a seal-coat type coating layer.

The material of the invention may also be used as a protective coating for parts comprising a monolithic ceramic substrate based on SiC or a monolithic substrate based on carbon (graphite).

The ultra-refractory material of the invention contains at least two constituents, namely a hafnium compound and a tantalum compound.

In the material of the invention, hafnium and tantalum are present exclusively in the form of compounds or of derivatives. The material of the invention does not contain hafnium or tantalum in elemental form, which is said to be "metallic", since that form is very unstable in the presence of water.

Hafnium and tantalum compounds are present in the material of the invention in non-oxide form so that the ultra-refractory protection material of the invention forms an initial non-oxide system. Thus, prior to being used in an oxidizing medium at high temperature, the material of the invention does not contain any oxides that have already been formed, oxides being generated solely during utilization. Oxides that are formed initially, i.e. oxides that are already present in a material while it is being prepared, generally present a coefficient of expansion that is high and thermal conductivity that is low, and consequently they are sensitive to thermal shocks. While a material that initially includes such oxides is in use, the temperature rise of the material leads to thermal shocks involving those oxides, which can lead to the material cracking and/or spalling. With the material of the invention, such a drawback is avoided since oxides are formed only as the temperature is rising while the material is in use in an oxidizing medium.

While it is in utilization, i.e. in an oxidizing medium over temperature ranges that may go from several hundreds of degrees Celsius to more than 2300° C., the constituents of the system of the material act on their own or together to form protective oxides that enable the part or the protective coating constituted by the material of the invention to conserve mechanical integrity and a refractory nature.

Hafnium and tantalum are selected because they correspond to very good basic constituents for the system formed by the material of the invention, in particular because of their high resistance to thermal shocks and their capacity to form an effective barrier against oxygen at high temperatures.

Tantalum does not suffer active oxidation, and the oxide it forms is more stable than $B_2O_3$ or $SiO_2$. Tantalum oxide also provides a liquid phase that is stable and that limits diffusion of oxygen and water within the material. Hafnium oxide remains solid and stable at high temperature and thus makes it possible to prevent the liquid phase being blown away by any surrounding stream (e.g. high speed combustion streams flowing in a nozzle).

Hafnium and tantalum are preferably present in the material of the invention in boride form. Under certain circumstances, they may also be present in carbide and nitride form.

The material of the invention may thus also include one or more of the following elements: carbon and nitrogen.

The atomic ratio of hafnium to tantalum is strictly greater than 1 and less than 10 ($1<n_{Hf}/n_{Ta}<10$), and preferably the ratio $n_{Hf}/n_{Ta}=2.7$, while the atomic ratio of boron to tantalum is greater than or equal to 5.4 ($n_B/n_{Ta}\geq5.4$).

In a non-limiting example, the ultra-refractory material of the invention may be constituted by:
50% by volume $HfB_2$;
25% by volume HfC; and
25% by volume $TaB_2$.

Thus, the composition of the invention preferably contains boron that serves to provide first healing at about 1700° C. As mentioned above, the boron is provided in the composition in the form of hafnium and tantalum compounds. In the present invention, boron should not be provided in the form of nickel or iron boride since those metallic elements diminish the refractory nature of the composition.

In addition, the composition of the invention does not contain silicon so as to avoid the problems of active oxidation of silicon-based compounds of high levels of volatilization of $SiO_2$ formed by oxidation.

The material of the invention may in particular be made using a composition comprising a mixture of powders of at least two of the above-described constituents.

After being shaped, e.g. by cold compacting in a mold (pelleting), the powder mixture is densified by spark plasma sintering (SPS). SPS is a process similar to conventional hot pressing, which could also be used for densifying the shaped composition. SPS consists in heat treatment under pressure with an electric current being passed that enables the part to be consolidated by forming bonds between grains without the grains melting completely. Such welding performed by diffusion of material is accompanied by densification, i.e. a reduction in porosity and hardening that imparts cohesion to the shaped object.

The composition shaped to have the shape of the part that is to be made is inserted into an enclosure that enables uniaxial pressure to be applied during sintering. A device for performing this SPS is sold in particular by the supplier Sumitomo Electric Industries and it serves to subject the sample to (3.3 millisecond (ms)) pulses of direct electric current (typically in the range 0 to 10 volts (V) and in the range 1 kiloamp (kA) to 5 kA) while applying a pressure of several tens of MPa (up to 150 MPa) with this taking place in a temperature range varying from ambient temperature up to 2000° C. SPS is generally performed under a vacuum, but it is also possible to work in an inert atmosphere (nitrogen, argon).

The same sintering cycle may be used as a reference for SPS densifying various refractory material compositions of the invention, with only the final sintering temperature being modified as a function of the refractory nature of the constituents to be sintered.

The temperature parameters selected for the sintering cycle may for example be: a rise to 600° C. in 3 minutes (min), followed by a rise to the sintering temperature of 1600° C. at a rate of 100° C./min, followed by a pause at that temperature for 5 min, and finally a drop to 600° C. in 30 min, and then stopping heating.

During the cycle, a pressure of 40 MPa is applied progressively from the beginning of the temperature rise to 600° C. in order to close most of the remaining pores and avoid non-uniform densification in the material after sintering. Thus, from the beginning of sintering, it is possible to obtain material that is dense overall, in which contact between grains is optimized.

The controlled cooling enables residual stresses of thermal origin to relax and avoids cracks and microcracks being present in the material.

The molds or the pistons used are made of graphite and they are separated from the composition in the form of compacted powder by a sheet of graphite in order to avoid any adhesive bonding.

When making a protective coating by SPS around a part that comprises a substrate of thermostructural composite material (e.g. of C/C or of CMC) or of monolithic SiC, the substrate of the part is placed in the sintering mold on a bed of powder (corresponding to the powder mixture of the constituents making up the material of the invention), and is then covered in the same powder so as to be completely at the center of the part formed by SPS. Nevertheless, if so desired, only a portion of the surface of the substrate of the part need be covered by the material of the invention, e.g. when only a portion of the surface needs to be protected.

The monolithic parts and the protective coatings of refractory material that withstand high temperatures in an oxidizing medium of the invention may also be made by:
  standard sintering;
  plasma sputtering;
  hot pressing;
  physical vapor deposition (PVD);
  by using a slip; or
  by immersion.

For a part comprising a substrate made of C/C composite material, a layer of SiC and a layer of ZrC of HfC can be formed between the substrate and the ultra-refractory coating, the layer of SiC being formed close to the C/C composite material of the substrate of said part and the layer of ZrC or of HfC being interposed between the layer of SiC and the protective coating.

The layers of SiC and of ZrC or of HfC may be formed using a slip. The layers of SiC and of ZrC or of HfC may also be formed by impregnating the C/C material of the substrate of the part with a molten reactive composition containing at least silicon in the range 5% to two-thirds in atomic percentage or proportion, and at least zirconium in the range one-third to 95% as described in document WO 2009/081006, the content of which is incorporated herein by reference. The silicon and the zirconium react with the carbon of the material treated at a temperature higher than the melting temperature of the metal. This enables a single operation to form two carbide phases with a first phase of SiC on the carbon of the substrate followed by a second phase of ZrC or of HfC on the layer of SiC.

When protecting a composition material, it is possible to anchor the ultra-refractory protective coating of the invention in the composite material or in layers of SiC and of ZrC or HfC by performing said coating by immersion, by using a slip, or by suction submicronic powder (SSP).

In order to verify the effectiveness of a refractory material of the invention, tests have been performed on samples of C/C composite material.

The photograph of FIG. 1 shows the results obtained on a substrate 10 of C/C composite material covered in a protective layer 20 containing 50% by volume $HfB_2$, 25% by volume HfC, and 25% by volume $TaB_2$. The testpiece as constituted in this way was exposed to thermal flux at 2200° C. in a corrosive atmosphere. It can be seen that only a top portion 20a of the protective layer 20 was oxidized, the underlying portion 20b remaining intact. The C/C substrate 10 was consequently fully protected.

Figure 2:
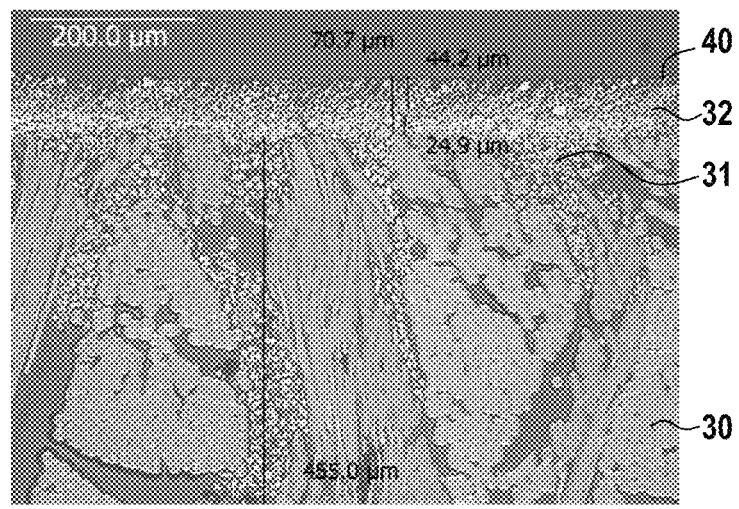
FIG. 2 is a photograph showing a fragmentary section view prior to corrosion of a multilayer material comprising a C/C composite substrate with respective layers of SiC and ZrC on its surface, the substrate being coated in a layer of protection material of the invention.

The photograph of FIG. 2 shows a multilayer material obtained from a substrate 30 of C/C composite material having an SiC phase 31 and a ZrC phase 32 on its surface, said substrate also being covered in a protective layer 40 containing 50% by volume $HfB_2$, 25% by volume HfC, and 25% by volume $TaB_2$.

The table given below shows the shrinkage speeds as measured during corrosion testing at the active oxidation temperature of SiC (about 2000° C.) between:
  a material in accordance with the invention containing 50% by volume $HfB_2$, 25% by volume HfC, and 25% by volume $TaB_2$;
  an ultra-refractory material containing a reference $ZrB_2$—SiC—$Y_2O_3$ composition that withstands corrosion better than the composition based on $ZrB_2$—ZiC (20% by volume); and
  a thermostructural C/SiC composite material.

The table shows that the material of the invention performs better than the C/SiC material and better than the reference ultra-refractory material ($ZrB_2$—20 vol % SiC—20 vol % $Y_2O_3$).

| Material | Degradation rate ($\mu m \cdot s^{-1}$) |
| --- | --- |
| $HfB_2$—25 vol % HfC—25 vol % $TaB_2$ | 1.4 ± 0.2 |
| $ZrB_2$—20 vol % SiC—3 vol % $Y_2O_3$ | 3.0 ± 0.2 |
| C/SiC | 7.5 ± 0.3 |

The invention claimed is:

1. A refractory material containing:
   50% by volume $HfB_2$;
   25% by volume HfC; and
   25% by volume $TaB_2$.

2. A refractory part, the part being wherein it is constituted by a refractory material according to claim 1.

3. A part comprising a substrate made up of a determined material, said part being provided with a protective coating for providing protection, the part being wherein said protective coating is constituted by a refractory material according to claim 1.

4. The part according to claim 3, wherein the substrate is made of a monolithic ceramic material based on silicon carbide or of a monolithic material based on carbon, or of a ceramic matrix composite material comprising silicon carbide.

5. The part according to claim 3, wherein the substrate is made of C/C composite material.

6. The part according to claim 5, further comprising a layer of silicon carbide close to the C/C composite material of the substrate of said part and a layer of zirconium carbide or of hafnium carbide interposed between the silicon carbide layer and the protective coating.

7. A method of making a part out of refractory material, the method comprising:
   making a composition containing:
     50% by volume $HfB_2$;
     25% by volume HfC;
     25% by volume $TaB_2$; and
   shaping the composition and densifying said composition.

8. A method of making a protective layer on a part comprising a substrate made of a determined material, said method comprising:
   applying on the part a composition containing:
     50% by volume $HfB_2$;
     25% by volume HfC;
     25% by volume $TaB_2$; and
   densifying said composition.

9. The method according to claim 8, wherein the substrate is made of monolithic ceramic material based on silicon carbide, or on monolithic material based on carbon, or of ceramic matrix composite material comprising silicon carbide.

10. The method according to claim 8, wherein the substrate is made of C/C composite material.

11. The method according to claim 10, further comprising forming a layer of silicon carbide close to the C/C composite material of the substrate of said part and forming a layer of zirconium carbide or of hafnium carbide interposed between the layer of silicon carbide and the protective layer.

* * * * *